March 18, 1924.

E. G. SOHLBERG 1,487,614

REACTANCE COIL

Filed Feb. 26, 1923     3 Sheets-Sheet 1

Inventor:
Erik G. Sohlberg
by Alexander F. Lunt
His Attorney.

March 18, 1924. 1,487,614
E. G. SOHLBERG
REACTANCE COIL
Filed Feb. 26, 1923  3 Sheets-Sheet 2
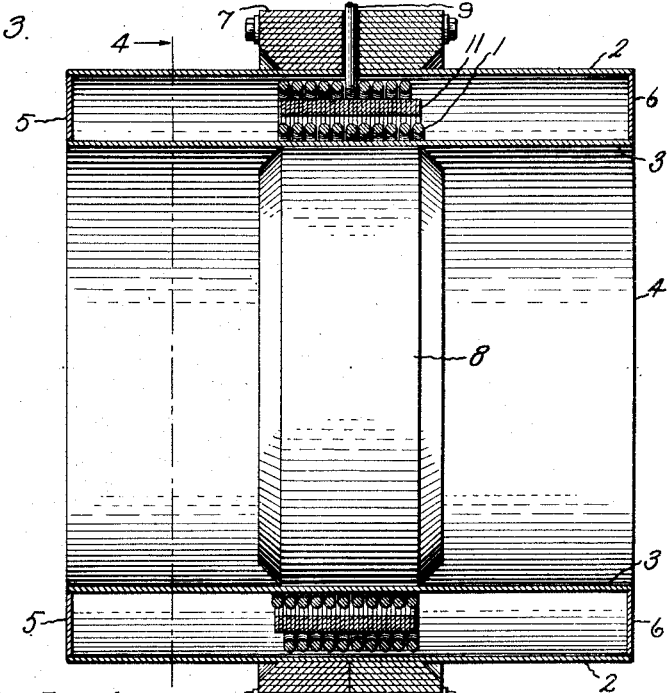
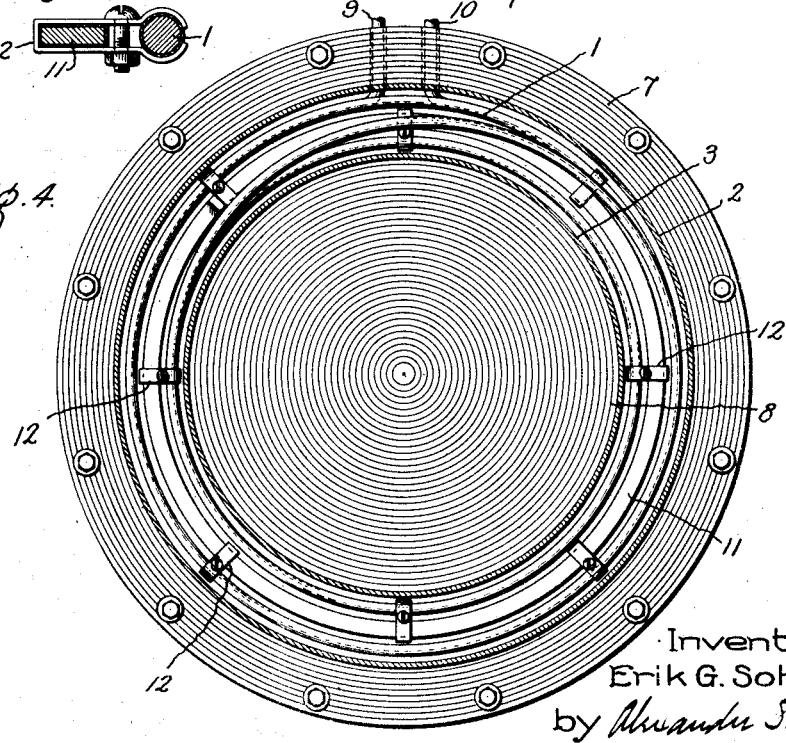
Inventor:
Erik G. Sohlberg,
by Alexander T. Lunt
His Attorney.

March 18, 1924. 1,487,614

E. G. SOHLBERG

REACTANCE COIL

Filed Feb. 26, 1923   3 Sheets-Sheet 3

Inventor:
Erik G. Sohlberg
by Alexander S. Lime
His Attorney

Patented Mar. 18, 1924.

1,487,614

UNITED STATES PATENT OFFICE.

ERIK G. SOHLBERG, OF SCHENECTADY, NEW YORK, ASSIGNOR TO GENERAL ELECTRIC COMPANY, A CORPORATION OF NEW YORK.

REACTANCE COIL.

Application filed February 26, 1923. Serial No. 621,146.

*To all whom it may concern:*

Be it known that I, ERIK G. SOHLBERG, a citizen of the United States, residing at Schenectady, in the county of Schenectady, State of New York, have invented certain new and useful Improvements in Reactance Coils, of which the following is a specification.

My invention relates to reactance coils and more particularly to a type of protective reactor adapted to be so influenced by changes in current strength as automatically to vary its own reactance and thus to provide protection or regulation for alternating current circuits and apparatus.

Some electrical circuits are subjected at times to conditions or influences tending to cause abnormally high and dangerous increases in potential and current and it is the general object of this invention to provide a variable reactance coil which will automatically increase the reactance of an electrical circuit to prevent the occurrence of potentials and currents exceeding safe maximum limits. The invention has utility in connection with a number of different types of circuits among which may be mentioned outdoor power and transmission circuits and the supply circuits for some types of electrical machinery such as induction motors. Power and transmission circuits are frequently subjected to disturbances such as may be caused by lightning, switching operations, breakdown of insulators, short circuits and grounds. Such disturbances often tend to cause increases in potential and current to several or many times their normal values resulting in injury to circuits and apparatus and interruption to service. When a supply circuit for an induction motor is closed to start the motor, the tendency is for a starting current to build up suddenly to a value considerably above normal and afterward to decrease to normal value as the machine comes up to speed. In such instances as these, the invention offers a means for quickly and automatically introducing sufficient reactance into a circuit under abnormal conditions to limit the flow of current to safe values.

Figure 1:
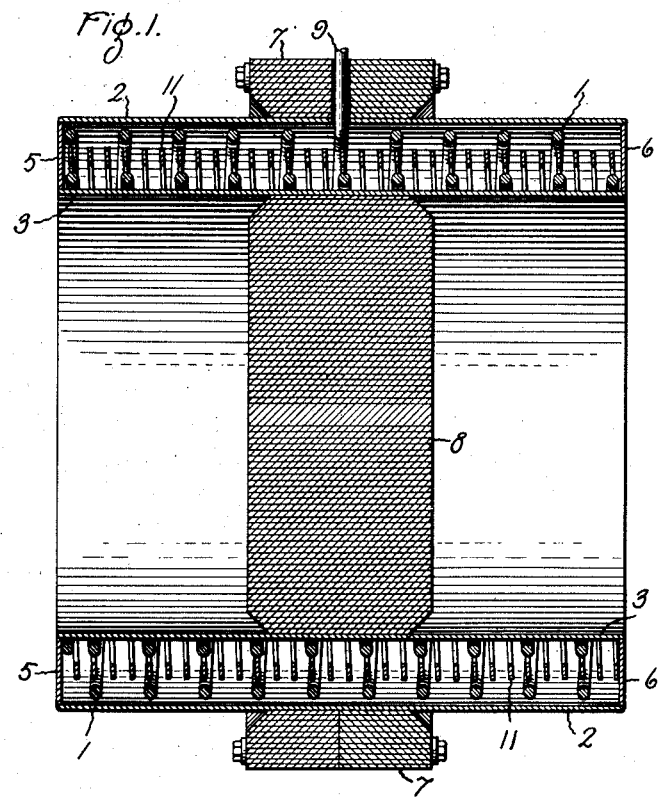
Figure 2:
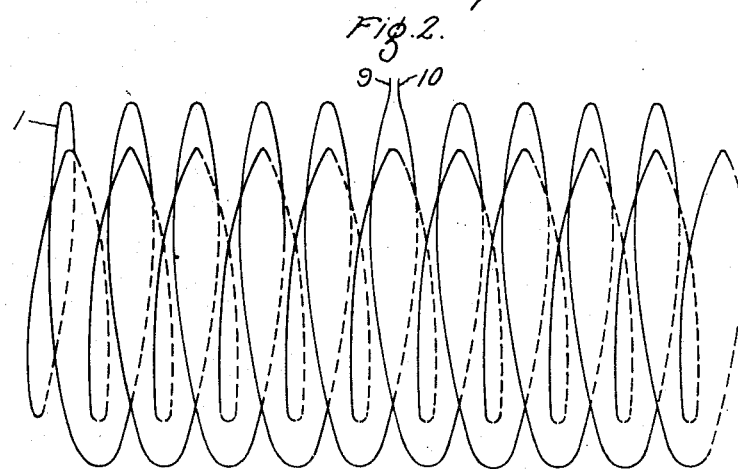
Figure 6:
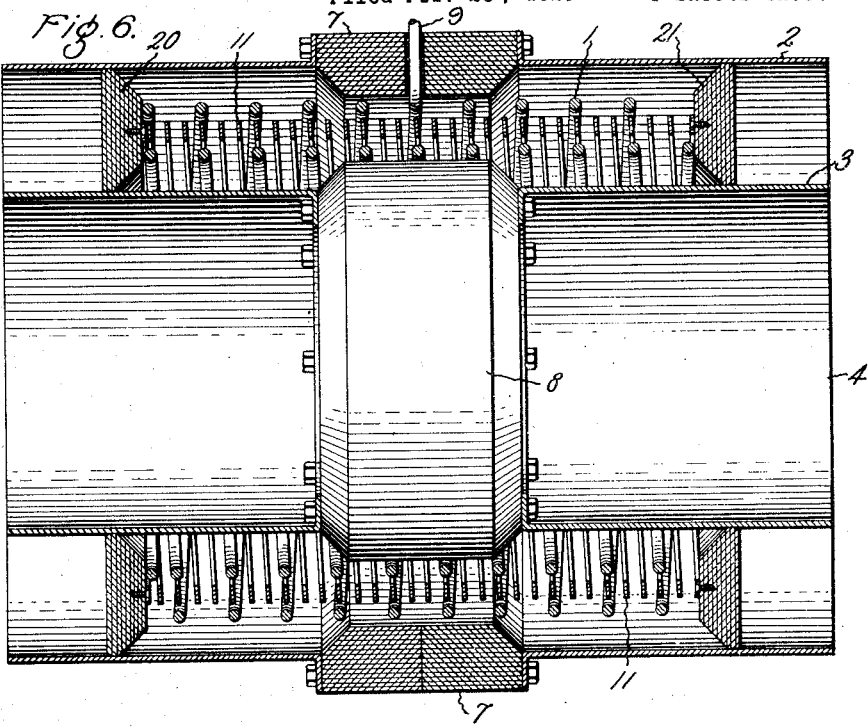
Figure 7:
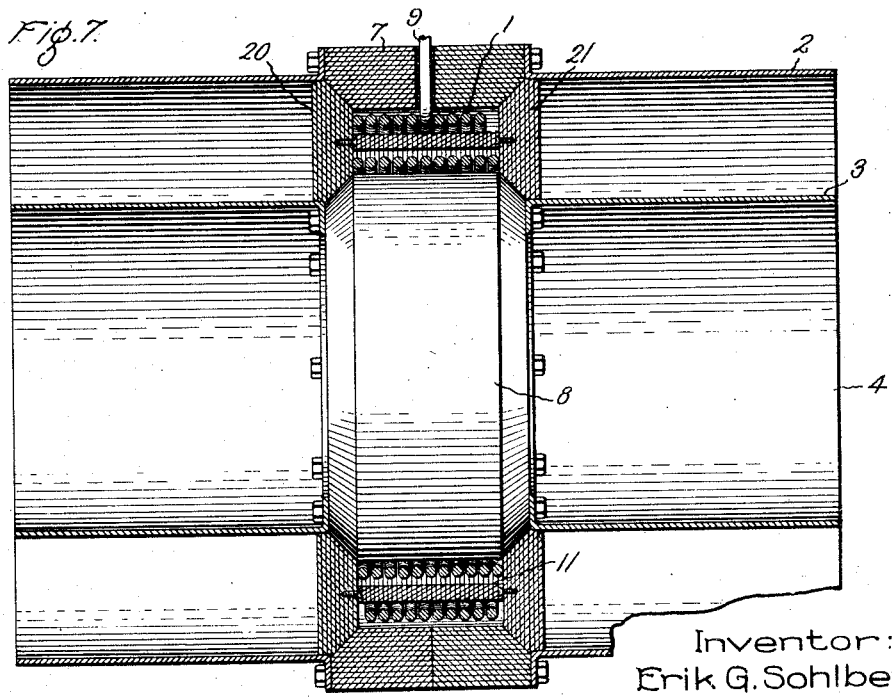

The principles of the invention will be described in connection with the accompanying drawings in which Fig. 1 is a longitudinal sectional view of a reactance coil constructed in accordance with the invention; Fig. 2 is a diagrammatic view showing the arrangement of the conductor in the specific form of coil shown in Fig. 1; Fig. 3 is a view similar to Fig. 1 but with the coiled conductor collapsed or drawn together to provide maximum inductance; Fig. 4 is a cross section on the line 4—4 of Fig. 3; Fig. 5 shows a form of clamp which may be used in supporting the conductor of Figs. 1 and 3; Fig. 6 is a longitudinal sectional view of a modified form of the invention and Fig. 7 is a view similar to Fig. 6 but with the coiled conductor collapsed.

Like reference characters indicate similar parts in the different figures of the drawings.

In the particular form of the invention disclosed in Figs. 1 to 5 inclusive, there is shown a continuous coiled conductor 1 comprising an inside layer and an outside layer of turns. The coiled conductor 1 is supported in the space between outer and inner cylindrical walls 2 and 3 of a casing 4 formed of any suitable nonmagnetic insulating material. The space is closed at its ends by annular end pieces 5 and 6. A ring-shaped laminated outer core member 7 surrounds the coiled conductor 1 and its casing 2 and a second laminated core member 8 fits inside the conductor and its casing. The terminals 9 and 10 of the conductor 1 are near the center of the outer layer of turns and are brought out through insulated openings through the wall 2 and the outer core member 7. The conductor therefore extends from one of these terminals through approximately half the outer layer of turns, thence through the inner layer of turns and thence through the other half of the outer layer to the other terminal as most clearly disclosed in Fig. 2. The conductor 1 is preferably formed of some suitable resilient material and is normally distended or expanded with its turns spaced apart as indicated in Fig. 1. A resilient spring 11 between the inner and outer layers of the conductor 1 supports and reinforces the conductor, being secured mechanically to the conductor at suitable points throughout its length by clamps 12. These clamps 12 are insulated from the conductor 1 and the spring 11 to prevent short circuiting sections of the conductor.

A flow of current in the conductor 1 induces a magnetic field which of course tends to cause the coil to collapse or contract into the position shown in Fig. 3. Because of the normal spacing of the turns of the conductor, however, there is large leakage of the magnetic flux and the normal reactance introduced by the coil into a circuit is therefore low. The strength of the conductor 1 and its supporting spring 11 opposes the force of the magnetic field and under normal conditions maintains the conductor in distended position with its turns spaced apart. The strength of the conductor 1 and spring 11 is such, however, as to be overcome by the increased magnetic field induced by a predetermined abnormal current approaching dangerous values, the turns of the conductor being quickly drawn together as indicated in Fig. 3. In the collapsed condition of the coiled conductor, the leakage of magnetic flux is negligible or slight and the coil has much greater reactance than when in its normal distended position. The current is thus limited to safe values at all times, and especially during the occurrence of abnormal conditions, by the automatic increase of reactance. As soon as the cause tending to create the abnormal current or voltage is removed, the coiled conductor quickly expands, thus automatically decreasing its reactance to normal value and again permitting normal operation of the circuit.

Lightning, short circuits and other sudden changes in circuit conditions often tend to create extremely rapid increases in voltage and current values and it is important in such cases that any protective means relied upon become effective quickly and before the voltage and current have had time to become dangerous. By locating the coil terminals near the center of the coil as in the preferred arrangement which has been described, the coil may be completely collapsed without moving any turn more than approximately half the length of the coil. The time required for the reactance of the coil to change is therefore a minimum. A rapid increase in the reactance of the coil at the time when it is most needed is further contributed to by the relative motions of the several turns of the coil. As the coil rapidly collapses and the spacing of the turns decreases, each turn is caused to cut through the magnetic fields of force surrounding adjacent turns. This induces a counter electromotive force in the coil which to some extent aids the natural reactance of the coil at any instant during the collapse of the coil.

A still further feature of the reactive device in its preferred form is that the magnetic ore is considerably shorter than the expanded coil but substantially as long as the coil when collapsed. The core thus has little effect on the low reactance of the expanded coil but effects a large increase in reactance when the coil is collapsed.

The modified construction shown in Figs. 6 and 7 is similar to the construction already described and corresponding parts are indicated by the same reference characters. Laminated annular core members 20 and 21, are, however, attached to the outer ends of the reactive coiled conductor and are moved toward and from the main inner and outer core members as the coil collapses and expands. When the coil is collapsed, these core members 20 and 21 serve to close the gaps at the ends of the coil as shown in Fig. 7, thus still further increasing the reactance of the collapsed coil. The inertia of the core members 20 and 21 reduces somewhat the speed of the action of the coil but this is not objectionable unless extreme speed is necessary.

In both forms of the invention which have been described, the coiled conductor is aided in opposing the pull of its magnetic field by a resilient spring. Under some conditions, it may be found that the resiliency of the conductor itself will offer sufficient opposition to the pull of the magnetic field and obviously the spring may then be omitted. It may also be found desirable at times to rely wholly on the resiliency of a supporting spring as the force opposing the magnetic field of the conductor, the resiliency of the conductor itself being negligible.

What I claim as new and desire to secure by Letters Patent of the United States, is,—

1. A reactor comprising a supporting structure, and a resilient conductive coil having a portion fixed to said supporting structure, other portions of said coil being movable toward said fixed portion under the influence of the magnetic field induced by a current in the coil to increase the reactance of the coil.

2. A reactor comprising a supporting structure, and a resilient conductive coil having an intermediate portion thereof fixed to said supporting structure, the end portions of said coil being movable toward said intermediate fixed portion under the influence of the magnetic field induced by a current in the coil to increase the reactance of the coil.

3. A reactor comprising a supporting structure, and a resilient conductive coil having an intermediate portion thereof fixed to said supporting structure, the terminals of the coil being near said fixed portion thereof, and the end portions of said coil being movable toward said fixed intermediate portion and terminals under the influence of the magnetic field induced by a current in the coil to increase the reactance of the coil.

4. A reactor comprising a supporting structure, a conductive coil having a portion fixed to said supporting structure, other portions of said coil being movable toward said fixed portion under the influence of the magnetic field induced by a current in the coil to increase the reactance of the coil, and a resilient spring attached to said coil to oppose the force of the magnetic field.

5. A reactor comprising a conductive coil collapsible under the influence of the magnetic field induced by a current in the coil, said coil having its terminals disposed intermediate its ends.

6. A reactor comprising a conductive coil collapsible under the influence of the magnetic field induced by a current in the coil, said coil including a plurality of series connected layers with coil terminals connected at an intermediate portion of one of said layers.

7. A reactor comprising a conductive coil collapsible under the influence of the magnetic field induced by a current in the coil, and means for supporting and guiding the turns of the coil as the coil collapses.

8. A reactor comprising a conductive coil collapsible under the influence of the magnetic field induced by a current in the coil, and a magnetic core member adjacent said coil and shorter than the coil when expanded.

9. A reactor comprising a conductive coil collapsible under the influence of the magnetic field induced by a current in the coil, and a magnetic core member adjacent said coil and of substantially the length of the coil when collapsed.

10. A reactor comprising a conductive coil collapsible under the influence of the magnetic field induced by a current in the coil, and magnetic core parts fixed to relatively movable portions of said coil, whereby the spacing of said core parts may be reduced by the collapse of said coil.

11. A reactor comprising a conductive coil collapsible under the influence of the magnetic field induced by a current in the coil, inner and outer core members spaced from a movable end of said coil, and a core member attached to said movable end of the coil, whereby the latter core member may be drawn toward said inner and outer core members by the collapse of said coil.

In witness whereof, I have hereunto set my hand this 23rd day of February, 1923.

ERIK G. SOHLBERG.